(12) United States Patent
Mansingh et al.

(10) Patent No.: US 7,065,572 B1
(45) Date of Patent: *Jun. 20, 2006

(54) NETWORK MANAGEMENT SYSTEMS THAT RECEIVE CROSS CONNECT AND/OR OTHER CIRCUIT INFORMATION FROM NETWORK ELEMENTS

(75) Inventors: Suhas Mansingh, Rohnert Park, CA (US); Wayne Clayton Cannon, Healdsburg, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/838,804

(22) Filed: May 4, 2004

Related U.S. Application Data

(63) Continuation of application No. 09/586,257, filed on May 31, 2000, now Pat. No. 6,751,660.

(51) Int. Cl.
*G06G 15/173* (2006.01)
(52) U.S. Cl. ..................... 709/223; 709/224
(58) Field of Classification Search ........ 709/223–224; 370/236–353

See application file for complete search history.

(56) References Cited

U.S. PATENT DOCUMENTS

| 5,513,171 | A | | 4/1996 | Ludwiczak et al. ............ 370/13 |
| 5,652,787 | A | * | 7/1997 | O'Kelly ................. 379/114.01 |
| 5,696,697 | A | | 12/1997 | Blau et al. .................. 364/514 |
| 5,892,916 | A | * | 4/1999 | Gehlhaar et al. ........... 709/223 |
| 5,942,989 | A | | 8/1999 | Nagasawa et al. .......... 340/826 |
| 6,094,682 | A | | 7/2000 | Nagasawa .................... 709/224 |
| 6,260,062 | B1 | * | 7/2001 | Davis et al. ................. 709/223 |
| 6,366,955 | B1 | | 4/2002 | Haakana et al. ............ 709/221 |
| 6,411,809 | B1 | | 6/2002 | Haakana et al. ............ 455/446 |
| 6,614,785 | B1 | | 9/2003 | Huai et al. .................. 370/352 |
| 6,657,969 | B1 | | 12/2003 | Neuendorff et al. ........ 370/245 |
| 6,751,660 | B1 | * | 6/2004 | Mansingh et al. .......... 709/223 |
| 2003/0012142 | A1 | | 1/2003 | Nagahama .................. 370/250 |

* cited by examiner

*Primary Examiner*—Krisna Lim
(74) *Attorney, Agent, or Firm*—Campbell Stephenson Ascolese LLP

(57) ABSTRACT

A network management systems (NMS) queries network elements (NEs) and receives information on cross connects set up at the NEs and other circuit information. Multiple NMS systems can manage the network at the same time. If one NMS changes a cross connect on an NE, the NE will inform the other NMS systems. The cross connect information is used to provide up-to-date information on circuits set up in the network and to facilitate elimination of "orphaned" cross connects which should have been deleted but have not been deleted due to some network failure.

79 Claims, 11 Drawing Sheets

NETWORK MANAGEMENT SYSTEMS THAT RECEIVE CROSS CONNECT AND/OR OTHER CIRCUIT INFORMATION FROM NETWORK ELEMENTS

CROSS-REFERENCE TO RELATED APPLICATIONS

This application is a continuation of U.S. patent application Ser. No. 09/586,257, entitled "Network Management Systems That Receive Cross Connect And/Or Other Circuit Information from Network Elements", filed May 31, 2000, now U.S. Pat. No. 6,751,660 and naming Suhas Mansingh and Wayne C. Cannon as inventors. This application is assigned to CISCO TECHNOLOGY, INC., the assignee of the present invention, and is hereby incorporated by reference, in its entirety and for all purposes.

BACKGROUND OF THE INVENTION

The present invention relates to networks, and more particularly to management of network circuits.

A network includes nodes (also called network elements, or NEs) interconnected by links. A network circuit can traverse one or more NEs. Each intermediate NE performs a cross connect function connecting the circuit data from one link to another to deliver the data to the circuit destination.

Computerized network management systems (NMS) have made it easier for human users to create, delete, and modify circuits. An NMS can run on a computer connected to an NE. To create, delete, or modify a circuit, a user issues a command to the NMS. The NMS in turn issues commands to each NE through which the circuit passes. The NEs configure themselves as needed.

The NMS can also use the user's commands as a source of information on circuits in the network, and can display that information back to the user.

It is desirable to provide improved NMS systems.

DESCRIPTION OF PREFERRED EMBODIMENTS

Figure 1:
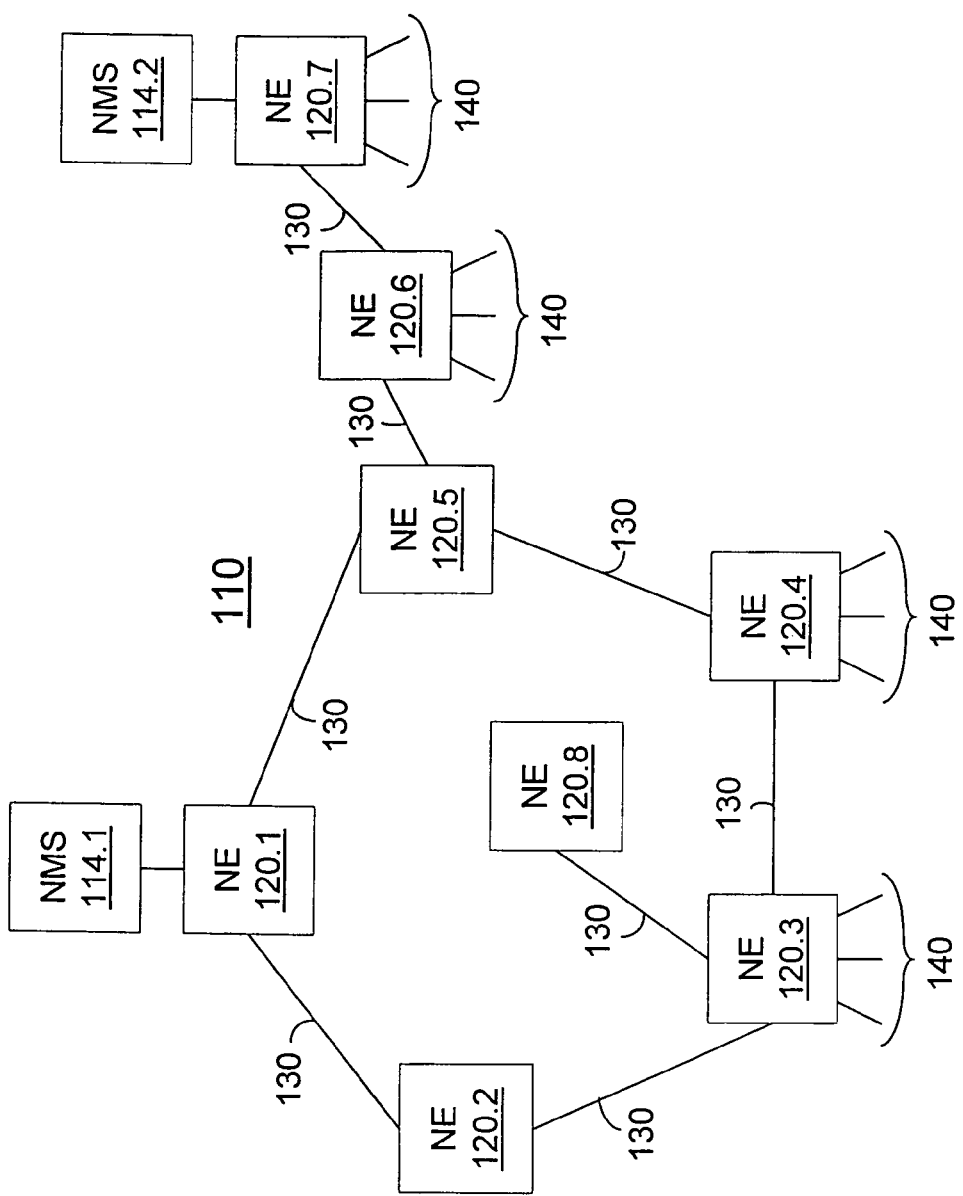
FIG. 1 is a block diagram of a network and network management systems according to one embodiment of the present invention.

FIG. 1 illustrates a SONET network 110 managed via network management systems 114.1, 114.2 according to one embodiment of the invention. SONET is a circuit-switched digital network described, for example, in W. Goralski, "SONET: A Guide to Synchronous Optical Networks" (1997) incorporated herein by reference. Network 110 may or may not be part of a larger SONET or non-SONET network. In FIG. 1, network 110 includes eight network elements (NEs) 120.1 through 120.8, though any other number of NEs is possible. The NEs are interconnected by optical fiber links 130. Each link 130 includes an optical fiber cable or multiple cables connected serially, possibly via regenerators, as known in the art. Two NEs may be interconnected by more than one link. For example, in FIG. 2, the NEs 120.2 and 120.3 are interconnected by two links 130.1 and 130.2 going in the opposite directions. Similarly, NEs 120.3 and 120.4 are interconnected by two links 130.3, 130.4 going in the opposite directions.

Each link 130 carries one or more transport signals, i.e. STSs (Synchronous Transport Signals) or VTs (Virtual Tributaries). Each transport signal is transmitted at regular intervals of time, every 125 µs, whether or not the signal's payload carries any useful data. The data for the payload are provided by other networks or network stations (not shown) connected to one or more NEs 120 by links 140. Each of NMS systems 114.1, 114.2 allows a user (e.g. a network manager) to configure the NE cross connects so that the traffic arriving on a given link 140 at an NE 120 becomes inserted by the NE into the payload of a given transport signal, or so that an NE 120 drops a transport signal payload onto a given link 140.

Links 140 can be of any type, for example, OCn, DS1, Ethernet, or other types.

Each NE 120 has STS cross connect capability. One or more NEs 120 may also have VT cross connect capability. Each NMS 114 allows the user to program the NE cross connects.

Figure 2:
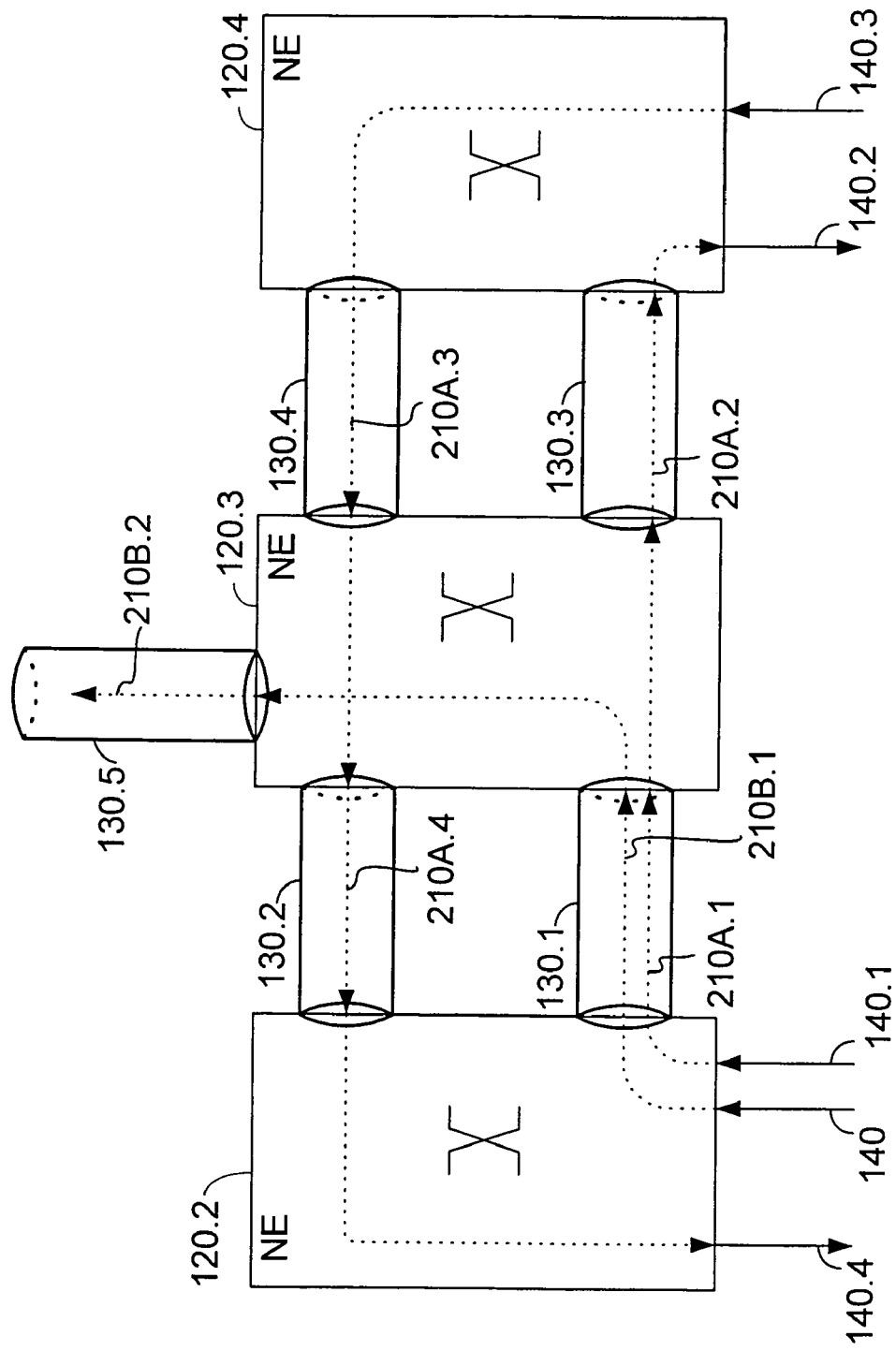
FIG. 2 is a block diagram illustrating circuits in the network for FIG. 1.

NE cross connects can be configured by the user to set up STS and/or VT circuits in the network. FIG. 2 illustrates two such circuits. Each circuit includes circuit spans described in Table 1 below. Each circuit span is associated with a link 130 and a transport signal (an STS or a VT). A "circuit span" should not be confused with the SONET term "span" used to denote a link 130.

TABLE 1

Circuits of FIG. 2

| Circuit | STS or VT circuit? | Segment | Link | STS and VT |
|---|---|---|---|---|
| A | STS | 210A.1 | 130.1 | STS-1 no. 2 |
| | | 210A.2 | 130.3 | STS-1 no. 1 |
| | | 210A.3 | 130.4 | . . . |
| | | 210A.4 | 130.2 | . . . |
| B | VT | 210B.1 | 130.1 | STS-1 no. 3, VT no. 2 |
| | | 210B.2 | 130.5 | STS-1 no. 3, VT no. 4 |

Circuit A is bi-directional. Its circuit spans 210A.1, 210A.2 carry traffic from NE 120.2 to NE 120.4. Its circuit spans 210A.3, 210A.4 carry traffic in the opposite direction. Circuit span 210A.1 carries data that has arrived at NE 120.2 on a link 140.1 (one of links 140 of FIG. 1). NE 120.2 cross connects this data onto STS-1 no. 2 on link 130.1. NE 120.3 cross connects this STS-1 signal onto STS-1 no. 1 on link 130.3, i.e. onto circuit span 210A.2. NE 120.4 cross connects the STS-1 no. 1 onto link 140.2.

The traffic carried by circuit spans 210A.3, 210A.4 is added at NE 120.4 from link 140.3 and dropped at NE 120.2 onto link 140.4.

Links 140.2, 140.3 may or may not be the same physical media (e.g., an Ethernet bus). Similarly, links 140.1, 140.4 may or may not be the same physical media.

In circuit A, traffic in each direction flows through the same NE 120.3. This is not necessary. Different directions of a circuit may pass through different sets of NEs.

Circuit B (circuit spans 210B.1, 210B.2, and others, not shown) is a unidirectional VT circuit. A VT is identified by its VT group, size, and the number within the group. Some embodiments support only one VT size. In such embodiments, VTs can be numbered across the groups and a VT can be identified by its number within the STS-1.

A unidirectional circuit may have more than one drop NE, i.e. the circuit may drop traffic on more than one NE.

Users add, delete, or modify circuits by issuing commands to management system 114.1 or 114.2. System 114.1 or 114.2 sends appropriate commands to appropriate NEs 120. When the NEs receive the commands, the NEs automatically configure themselves to provide appropriate cross connects.

In some embodiments, the SONET network 110 transfers management information via out-of-band SONET section DCC channels which are part of the SONET section overhead. The management information is transferred using the IP protocol over PPP (Point to Point Protocol). Other protocols (e.g. the OSI stack) can be used instead. The management information can also be transferred via non-SONET out-of-band control channels, e.g. via Ethernet. NEs 120 route the management information while switching the payloads of the transport signals. See U.S. patent application Ser. Nos. 09/343,122 (filed Jun. 29, 1999 by K. Neuendorff et al.), 09/444,052 (filed Nov. 19, 1999 by D. Hillard et al.), and 09/478,287 (filed Jan. 5, 2000 by Jin Huai et al.), which are incorporated herein by reference. However, the invention is not limited to IP, PPP, or any other protocol, or to SONET.

NMS systems 114.1, 114.2 do not have to be present in the network at the same time. Further, NMS 114.1 or 114.2 can be connected to an NE 120 to configure the circuits and can then be disconnected.

When NMS 114.1 or 114.2 is connected to the network 110, the NMS queries the NEs 120 for the state of their cross connects and/or for other circuit information that may be stored at the NEs. This allows each NMS to obtain circuit information even if the circuits have been modified by another NMS. Further, if an NMS 114 (i.e., 114.1 or 114.2) issued a command to an NE to provide a cross connect, and the command was not executed by the NE, the NMS will nonetheless have correct circuit information based on querying the NEs.

Figure 3:
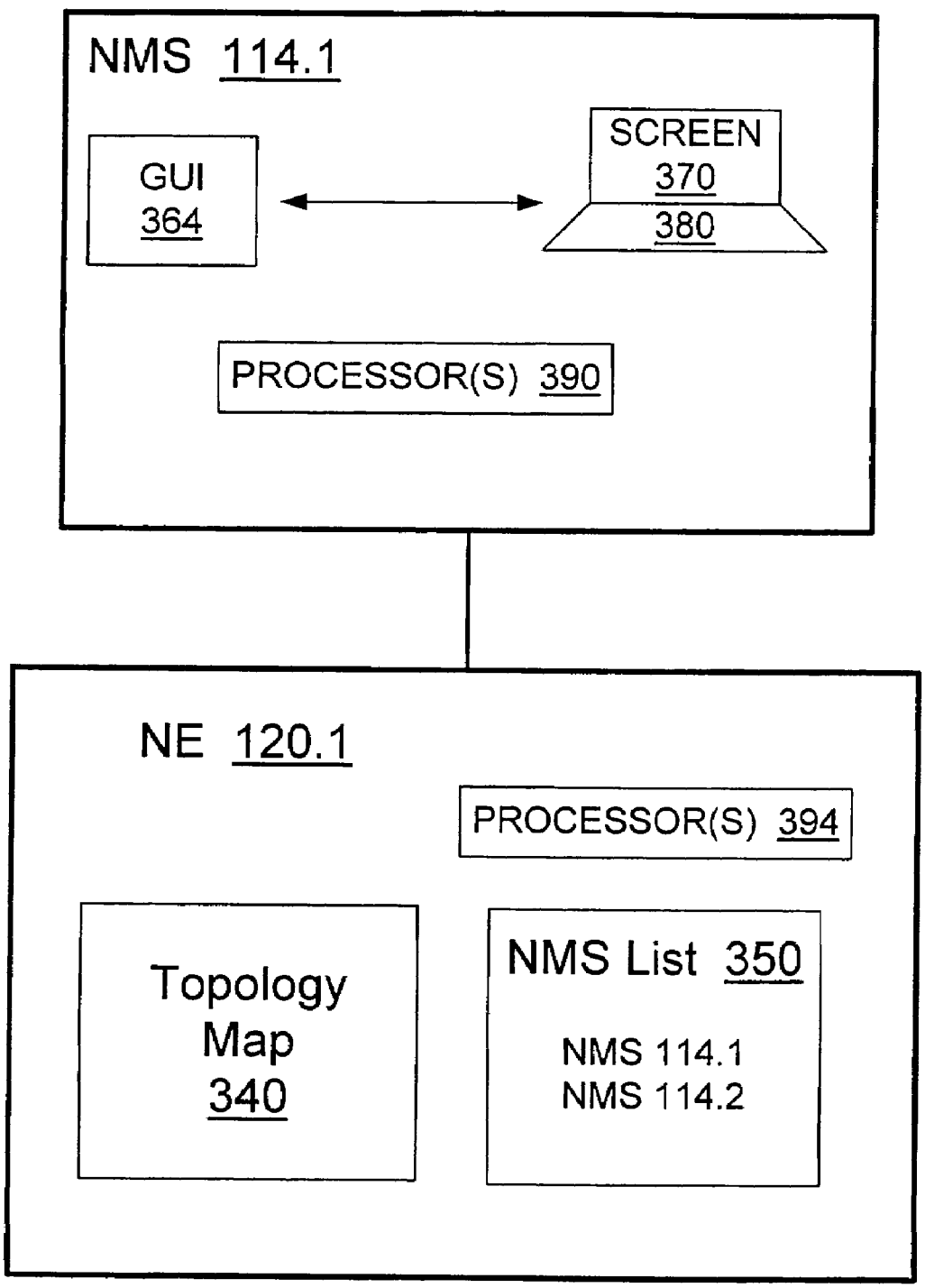
FIG. 3 is a block diagram of an NMS and an NE according to one embodiment of the present invention.

NMS systems 114.1, 114.2 may run on separate computers attached to NEs. Alternatively, each NMS may run on one or more NEs, or on any combination of NEs and separate computers. In FIG. 3, NMS 114.1 runs on a computer connected to NE 120.1 by an Ethernet link or via some other interface (e.g., a serial port, a wide area network, or some other interface). A network may include several NMS systems running concurrently on the same or different computers, connected to the same or different NEs 120.

We will now describe some embodiments to illustrate some aspects of the invention.

When an NE 120 is booted, the NE executes a link state protocol to obtain network topology. In some embodiments, the protocol is an extension of OSPF (Open Shortest Path First) executed over the section DCC channels. OSPF is described in many publications including, for example, W. R. Stevens, "TCP/IP Illustrated," Volume 1 (1994). See also Request for Comments (RFC) 2178 (Network Working Group, July 1997), and the aforementioned U.S. patent application Ser. No. 09/478,287. According to OSPF, each NE 120 sends link state advertisement messages (LSAs) to other NEs. Each LSA describes the state of a link 130 or 140 attached to the NE originating the LSA. In some embodiments, each LSA pertaining to a link 130 includes the following information for the link:

TABLE 2

LSA

1. Source NE's IP address (e.g. IP address of NE 120.2 for link 130.1 in FIG. 2).
2. Source NE's interface index. This unique index identifies the source NE interface to which the link is connected. For example, in FIG. 2, the NE 120.2 has unique interface indices for each of links 130.1, 130.2.
3. Destination NE's IP address (e.g. IP address of NE 120.3 for link 130.1).
4. Destination NE interface index.
 Each link is completely identified by its source and destination IP addresses and source and destination interface indices.
5. Protection. Exemplary values for this field are:
 a. two fiber BLSR;
 b. 1 + 1 (e.g. in a four-fiber BLSR);
 c. VT Tunnel. A VT tunnel link is a VT topology abstraction designating a link between two VT-capable NEs (NEs having VT cross connect capability). This abstract link may not exist as a physical link 130. The abstract VT link corresponds to an STS path which carries VTs and which is switched at intermediate NEs using STS cross connects rather than VT cross connects. For example, such a path may go from NE 120.1 to NE 120.3 through NE 120.2. NE 120.2 may be non-VT-capable. This path would show in the LSAs as a direct VT tunnel link from NE 120.1 to NE 120.3 though no such physical link exists.
 d. unprotected.
5. The cost associated with the link.

End of Table 2

The invention is not limited to OSPF or any link state protocol. PNNI or other link state protocols are used in some embodiments.

Each NE 120 generates a topology map 340 (FIG. 3) containing the data of Table 2 for each link 130.

Each NMS 114 (114.1 or 114.2) designates an NE 120 from which the NMS will receive the topology information in table 340. This NE will be called a "topology host" herein, or just a "host." In some embodiments, when an NMS starts up, it uses as a host the NE to which the NMS is connected (NE 120.1 for NMS 114.1 of FIG. 1, NE 120.7 for NMS 114.2). If the host NE becomes unreachable (for example, when NE loses power or link connecting the NMS to the NE becomes disconnected), the NMS may designate another NE as a topology host.

For each NE 120 in the topology map, NMS 114 sets up a TCP connection to the NE, and queries the NE for the cross connect and other circuit information. The NMS also registers with the NE to receive updates on changes in the NE's cross connect or circuit information. Each NE keeps a list 350 of all the NMS systems registered with the NE.

As the NMS gets pieces of the cross connect information and circuit information from the NEs, the NMS splices these pieces together and constructs representations of network circuits in a form which makes it easy for the user to trace each circuit from its source NE through the intermediate NEs to the destination(s). Graphical user interface (GUI) module 364 displays the circuits on screen 370.

Input devices such as, for example, a keyboard 380 or a mouse (not shown) allow the user to issue commands via GUI 364 to configure the circuits in network 110. In some embodiments, GUI module 364 includes an HTTP browser executing a Java applet loaded from the host NE. The browser provides the user interface, and the applet implements other functions such as circuit splicing. The invention is not limited to a browser, a keyboard, a mouse, or any other user interfaces.

Each host NE informs its respective NMS of any topology changes, and each NE informs the NMS systems registered with the NE of cross connect or other circuit information changes at the NE. The NMS re-splices the circuits when changes occur, so the user can always have up-to-date information displayed on screen 370.

In some embodiments, the NMS computer includes one or more computer processors 390 executing computer software. The computer can be a general purpose computer (e.g. a personal computer running a Windows (Trademark) operating system available from Microsoft Corporation of the state of Washington), or a special purpose computer, known or to be invented. Each NE may include one or more computer processors 394 executing computer software to communicate with NMS systems and perform other functions described herein. The invention is not limited to any particular software or hardware. Further, non-software implementation can be used.

Figure 4:
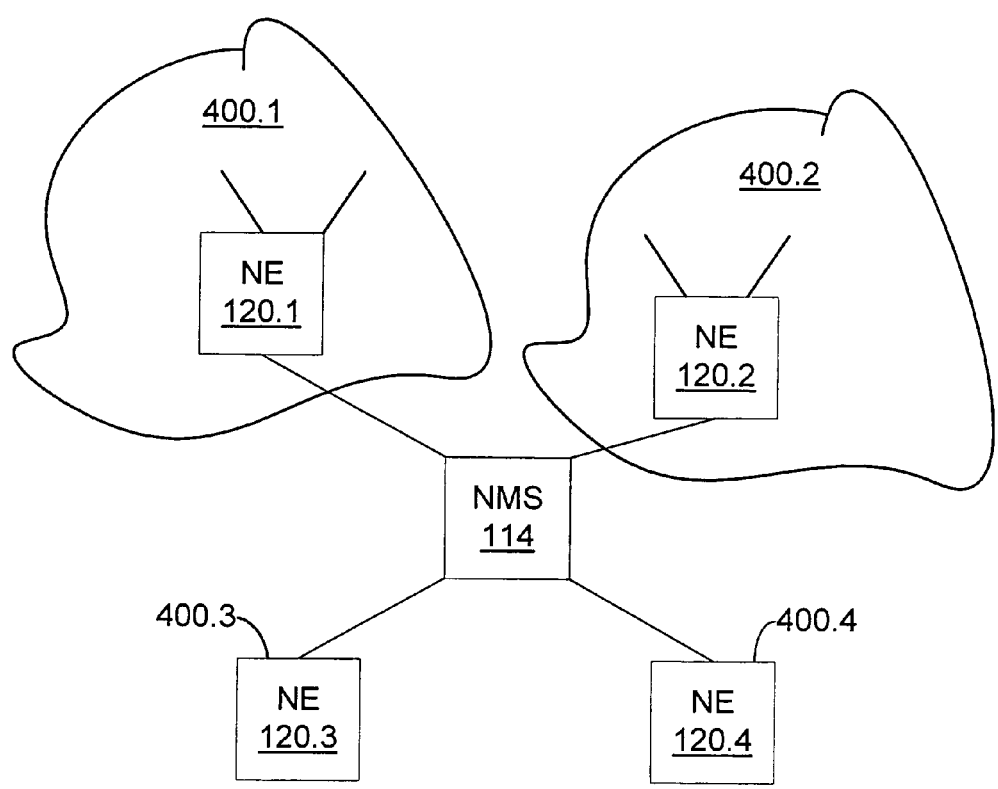
FIG. 4 is a block diagram of a network and a network management system according to one embodiment of the present invention.

In FIG. 4, NMS 114 manages four management domains 400.1, 400.2, 400.3, 400.4. Each of the domains 400.1, 400.2 contains multiple NEs 120. Each of the domains 400.3, 400.4 contains only one NE. Payload data may or may not be passed between the management domains, but the topology, cross connect, and circuit information is not passed between the domains. Each of the four domains has an NE connected to NMS 114 (NE 120.1 in domain 400.1, NE 120.2 in domain 400.2, NE 120.3 in domain 400.3, and NE 120.4 in domain 400.4). NMS 114 designates a host NE 120 in each domain 400. The invention is not limited to any particular number of network management domains.

Figure 5:
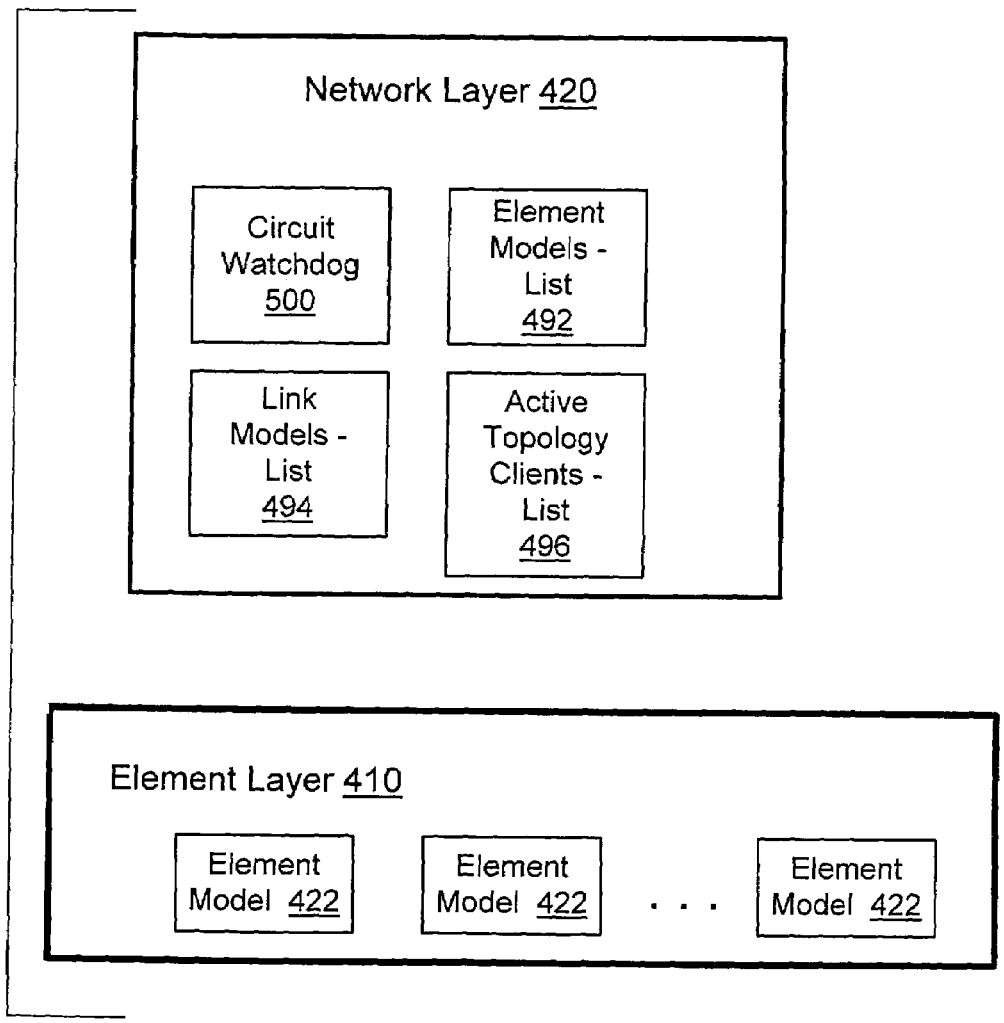
FIGS. 5 and 6 are block diagrams illustrating some features of an NMS according to one embodiment of the present invention.
Figure 6:
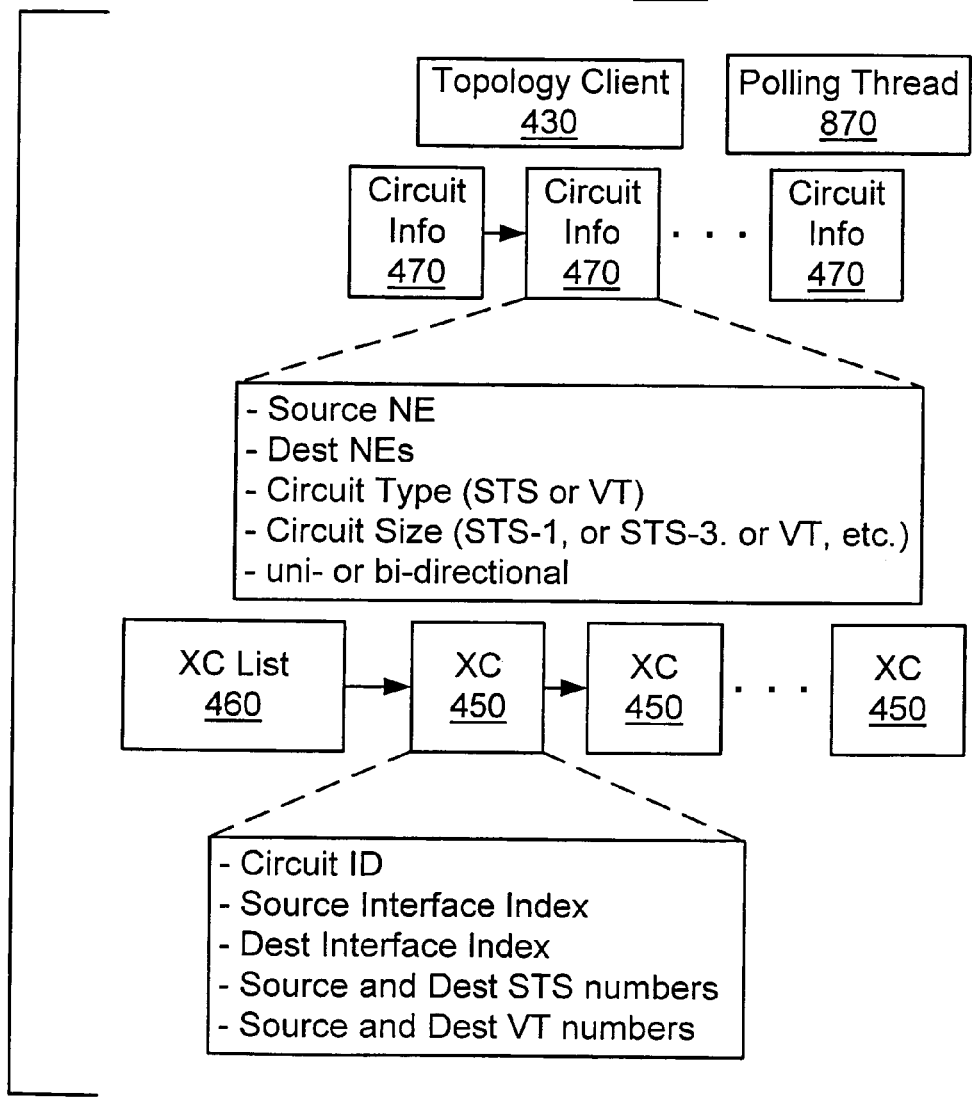

FIGS. 5 and 6 illustrate the software architecture of one embodiment of NMS 114. NMS 114 is implemented by object oriented software using CORBA (Common Object Request Broker Interface) designed by the Object Management Group. A CORBA implementation is provided by Sun Microsystems, Inc. of Palo Alto, Calif. The software can be stored on a computer readable medium as known in the art. However, the invention is not limited to any particular software or hardware architecture. Data structures and other details described for particular embodiments above and below are exemplary and do not limit the invention.

The NMS of FIGS. 5 and 6 includes an element layer 410 and a network layer 420. Layers 410, 420 are software modules. They should not be confused with layers of the OSI reference model or any other network layering. Element layer 410 communicates with the host NE via CORBA. Layer 410 receives the topology and cross connect and circuit information from the host NEs. Network layer 420 splices circuits and communicates with GUI module 364 (FIG. 3).

Figure 7:
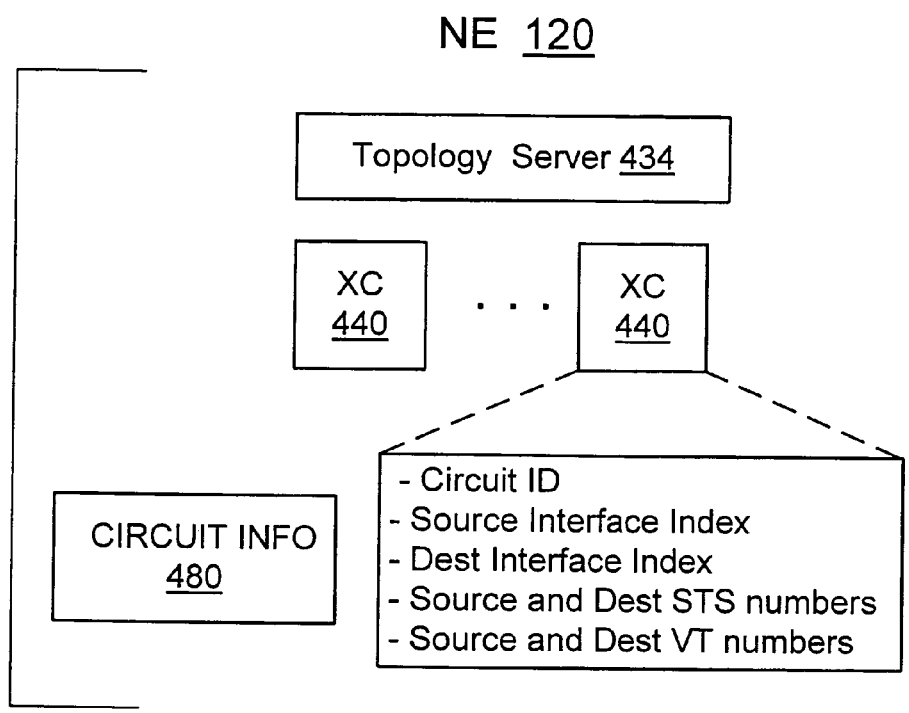
FIG. 7 is a block diagram illustrating some features of an NE according to one embodiment of the present invention.

For each NE 120, element layer 410 includes an element model 422. Element model 422 is a software object. In each element model 422, topology client 430 (FIG. 6) can receive topology map 340 from the corresponding NE's topology server 434 (FIG. 7). For each domain 400, the topology client 430 corresponding to the host NE registers with the topology server 434 of the host NE to receive topology updates. Topology clients 430 corresponding to non-host NEs are inactive.

For each cross connect defined on an NE 120, the NE stores a software object (XC object) 440. Object 440 contains information identifying the cross connect. Such information may include:

1. The corresponding circuit ID (assigned by an NMS 114 when the circuit is created).
2. The source interface index for the cross connect.
3. The destination interface index.
4. The STS number.
5. The VT number if this is a VT cross connect.
6. Any other information needed to define the cross connect. For example, if the cross connect has multiple destinations, then the XC object includes the destination interface indices, STS numbers, and VT numbers for each destination.

If a VT cross connect is at an end point (an entrance or exit) of a VT tunnel, the corresponding XC object 440 identifies the tunnel.

In some embodiments, the XC object 440 is stored only on the NE having the corresponding cross connect but not on any other NE.

For each XC 440 on each NE 120, the corresponding element model 422 has an XC object 450. XC 450 stores the same information as the corresponding XC 440.

"XC list" object 460 in element model 422 represents the list of XCs 450 for the NE. In FIG. 6, XCs 450 are shown as organized in a linked list, with object 460 referencing the first XC 450 in the list. In fact, the invention is not limited to linked lists or any other data structures or data organization. The same is true for lists 350 and any other data structures mentioned herein unless expressly stated otherwise.

For each circuit, the element layer 410 stores a "circuit info" object 470 containing the following information:
1. The source NE 120 of the circuit.
2. The destination NEs ("drop points").
3. The circuit type (STS or VT).
4. The circuit size (STS-1, or STS-3, or VT, etc.). In the embodiment being described, only one VT size is defined. Multiple VT sizes are defined in other embodiments.
5. Whether the circuit is uni- or bi-directional.

The circuit info 470 is stored in element model 422 of the source NE of the circuit. In some embodiments, the circuit info 470 is not stored in any other element model to save storage space. Each element model 422 stores a list of circuit info objects 470 for the circuits sourced on the corresponding NE.

The source NE stores "circuit info" object 480 (FIG. 7) having the same information as the corresponding object 470. In some embodiments, the NEs other than the source NE do not store the object 480 for the circuit. This saves storage space.

Network layer 420 maintains a list 492 of references to the element models 422, and a list 494 of references to link models. Each link model (not shown) is an object abstracting a link 130. This object stores information shown in Table 2 above.

Network layer 420 also maintains a list 496 of references to active topology clients. When a topology host NE becomes unreachable, the corresponding topology client is deactivated. Network layer 420 designates another NE as a host in the same domain 400, and updates the list 496.

Circuit watchdog module 500 in network layer 420 runs periodically (once every six seconds in some embodiments) to process information from element layer 410.

Figure 8:
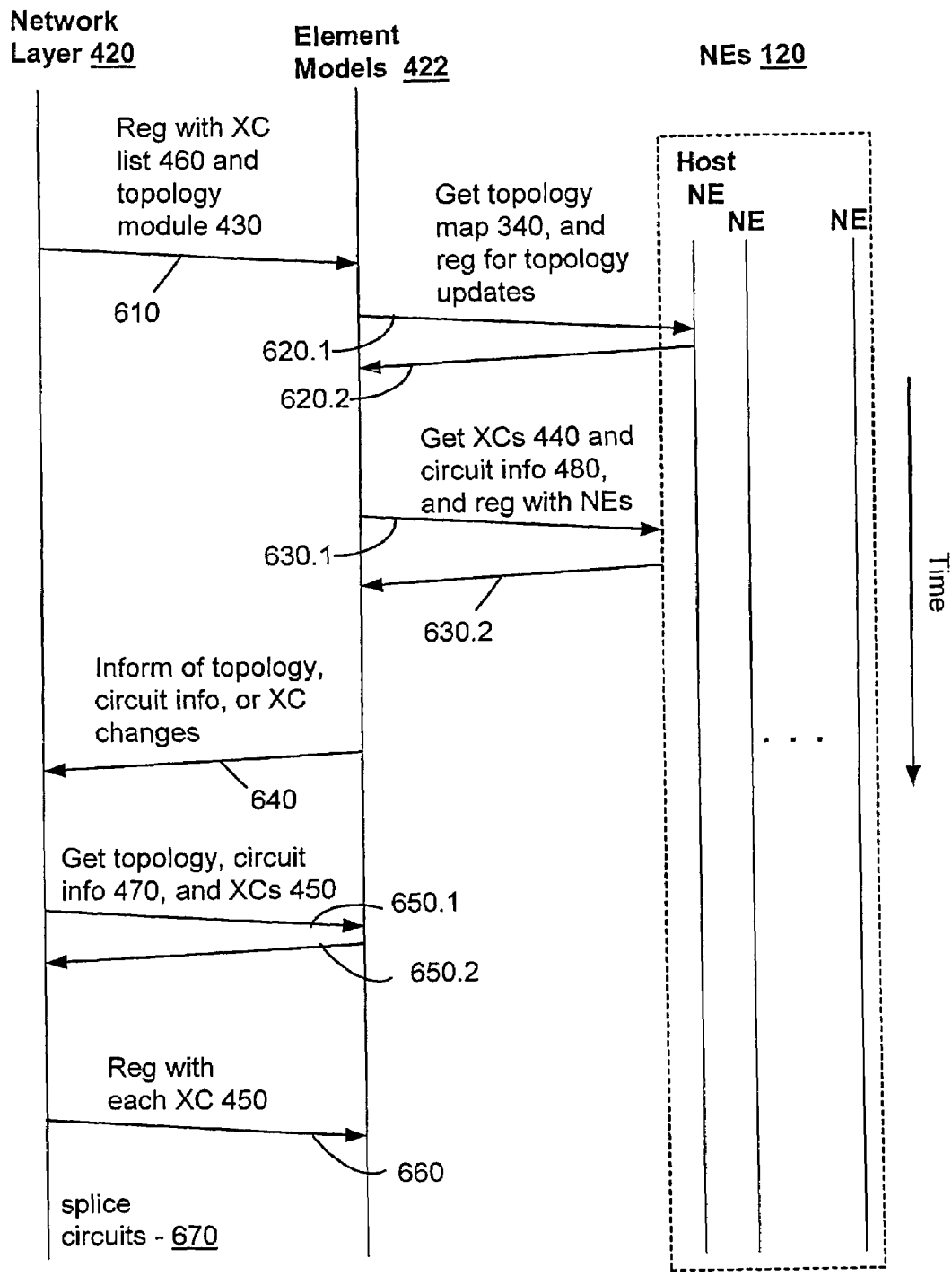
FIGS. 8–10 are timing diagrams illustrating the operation of some embodiments of the present invention.

FIG. 8 is a timing diagram for the NMS start-up. When the NMS starts up, the NMS creates an element model 422 for each NE known to the NMS, and places references to the element model in list 492. The only NE known to the NMS at this point may be the NE to which the NMS is connected. In addition, if a user has designated a host NE different than the NE to which the NMS is connected, the host NE may also be known to the NMS.

For each element model 422 in list 492, network layer 420 sends a message 610 to the corresponding XC list object 460 to register with the object 460. For each host NE in list 496, the NMS sends a message (also represented by numeral 610) to the corresponding topology client 430 to register for topology updates. XC lists 460 represent empty lists of XCs 450 since the NMS has not yet received any XC information from the NEs.

Element models 422 register the network layer 420 as requested.

Active topology clients 430 sends messages 620.1 to the respective host NEs 120 to get the topology maps 340 of the respective domains and also to register with the corresponding topology servers 434 for topology updates. The host NEs return the topology maps (messages 620.2).

The word "message" as used herein may denote a set of multiple messages. The multiple messages may go in the opposite directions. For example, in TCP embodiments, messages and their acknowledgments travel in the opposite directions. A message may be implemented by a procedure call or some other approach, known or to be invented.

For each new NE identified by a topology map, the NMS creates an element model 422.

Each element model 422 sends a message 630.1 to the corresponding NE 120. Message 630.1 request the NE to return the XC information in objects 440 and circuit information in objects 480. The message 630.1 also requests the NE to register the element model 422 for updates. The NE inserts the NMS into its list 350 (FIG. 3), and returns the requested information as message 630.2.

As the messages 620.2, 630.2 arrive, element models 422 construct the circuit info objects 470 and XC objects 450. The element models also inform the network layer 420, via messages 640, that the circuit info or XC information has changed. Active topology clients 430 inform the network layer of topology changes. Some of these changes were described above with respect to messages 620.2 (topology maps informing the NMS of new NEs). Similar messages informing the NMS of the XC, circuit info, and topology changes will be sent after start up when the element layer 410 receives topology, XC, or circuit info updates. Network layer 420 sends requests 650.1 for the changed information to respective element models 422. The element models return the changed information as shown at 650.2. If the information is a new XC object 450, network layer 420 sends a message 660 to element layer 410 to register with the XC object 450 for updates. XC object 450 will inform the network layer when XC attributes change or the XC is being deleted.

As the new information arrives, the network layer splices the circuits as shown at 670.

Figure 9:
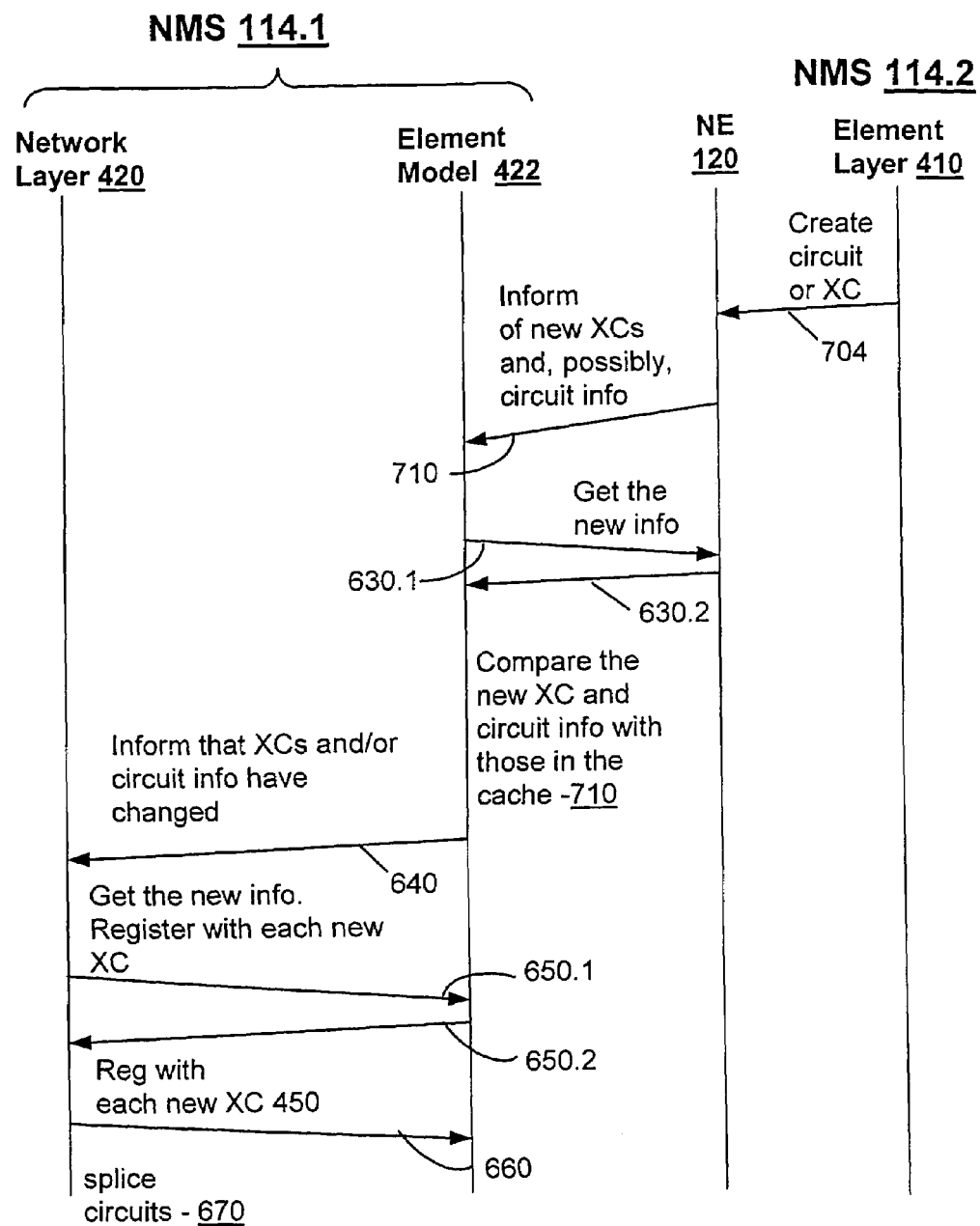

FIG. 9 is a timing diagram illustrating creation of a new circuit or a new cross connect. A command 704 to create the circuit and/or add the cross connect has been issued by NMS 114.2 to an NE 120. NE 120 sets up the cross connect, creates a corresponding XC object 440 (FIG. 7), and also creates circuit info object 480 if the command requires creation of a circuit. NE 120 sends a message 710 to each NMS registered with the NE, including the NMS 114.2 itself. Each NMS performs the same operations in response. Only the operation of NMS 114.1 is illustrated in FIG. 9.

The operations and messages 630.1–670 of FIG. 9 are similar to the identically numbered operations and messages of FIG. 8. Element model 422 corresponding to the NE 120 requests from the NE, and obtains, the new XC information 440 and, if pertinent, the new circuit information 480, as shown at 630.1, 630.2. Element model 422 compares the new information with the information stored in the element model's objects 450, 470 (FIG. 6), as shown at 710. In some cases, the new information can already be present at the element model. This may happen if an XC or a circuit have been deleted from the NE 120 and then recreated, but the element layer 410 has not updated its storage after the deletion. The new information can also be present at the element layer of NMS 114.1 if the command 704 to create the circuit and/or the cross connect has been issued by the NMS 114.1. In some embodiments, the NMS issuing the command creates the corresponding objects 450, 470 without waiting for the NE to create the circuit or the cross connect and return the circuit or cross connect information to the NMS. In some embodiments, the objects 450, 470 can be created even before the command 704 is issued. If comparison operation 710 shows that the new XC and circuit information is already present at the element layer, NMS 114.1 does not perform any further processing. If some information is not present, or the information is present but has different attributes, element model 422 informs the network layer 420 that XC and/or circuit information has changed (arrow 640). Network layer 420 gets the new information and registers with each new XC object 450 for updates (arrows 650.1, 650.2, 660). The circuit affected by the new information is re-spliced at 670.

In some embodiments, the network layer 420 also registers with the circuit info objects 470 for updates.

Similar processing takes place when a user issues a command causing a change in an attribute of an existing circuit info object 480 or XC object 440. An attribute can be any piece of information stored in the object, for example, a new drop point for the circuit info.

Figure 10:
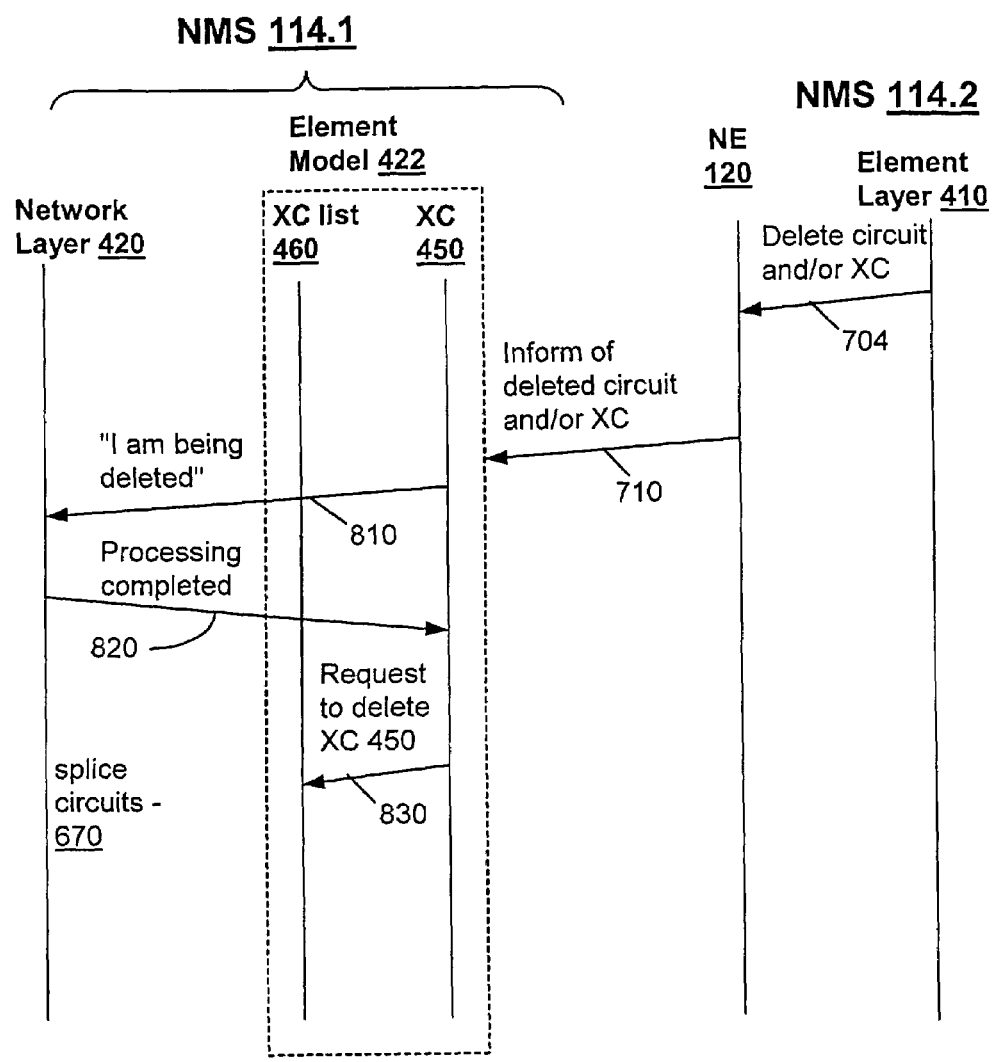

FIG. 10 illustrates deletion of a circuit or a cross connect. NMS 114.2 (the element layer) sends a deletion command 704 to an affected NE 120. The subsequent operation is shown only for NMS 114.1. Every other NMS (including NMS 114.2) performs the same operations.

NE 120 reconfigures itself to delete the XC, deletes the corresponding object 440, and deletes or modifies the circuit info 480 if needed. The NE also sends messages 710 to each NMS in the NE's list 350 that the XC and possibly the circuit have been deleted.

In element layer 410, the corresponding XC object 450 sends a message 810 to the network layer 420 registered with XC 450. The message informs the network layer that the XC 450 is being deleted.

The network layer records this information and sends a message 820 to XC 450. This message indicates that the network layer has done appropriate processing and that the XC 450 can be deleted. XC object 450 sends a request 830 to XC list object 460 of the corresponding element model to delete the XC 450. XC list 460 deletes the XC 450.

In addition, if the whole circuit is being deleted, element layer 410 deletes the corresponding circuit info object 470.

As shown at 670, network layer 420 updates information on the circuit. The updated information can be displayed to the user by GUI 364.

Similar processing is performed for changes in the network topology. NMS 114 detects topology changes via its topology clients 430. If an NE 120 has been removed from the network, its objects 450 are deleted using the same procedure as described above for operations 810, 820, 830, 670 (FIG. 10). The corresponding element model 422 and all its objects are deleted.

If a topology client 430 detects a new NE inserted into the corresponding domain 400, then an element model is created, and the new NE is processed as shown in FIG. 8 at 630.1 through 670.

Topology clients 430 store information on network links 130 in respective domains 400. Network layer 420 stores information on circuit spans, as described in U.S. patent application Ser. No. 09/444,052 filed Nov. 19, 1999 by D. Hillard et al. and incorporated herein by reference. Layer 420 derives the circuit span information from XC objects 450. If a topology client 430 detects that a link 130 has been removed, network layer 420 deletes the circuit span information for all the circuits passing through the link, and re-splices the circuits involved. If a circuit becomes incomplete, the circuit will be shown to the user as incomplete, as described in more detail below.

As stated above, the NEs 120 communicate with the NMS systems over TCP. When an NE 120 sends a message to an NMS 114 to inform the NMS of changes in the NE cross connect or circuit information (message 710 in FIGS. 9, 10), the TCP provides an acknowledgment from the NMS. If the acknowledgment is not received, the NE assumes the NMS has been disconnected, and removes the NMS from the NE's list 350.

Each element model 422 includes a polling thread 870 (FIG. 6) which periodically polls the corresponding NE. The NE returns a message indicating if the polling NMS is in the NE's list 350. If the NMS is not in the list, the NMS re-registers with the NE and obtains the cross connect information 440 and circuit information 480, as described above in connection with FIG. 8. In other embodiments, the NMS completely re-initializes itself as at start-up; see the description above in connection with FIG. 8.

If the NE does not respond to polling for some time, the polling thread 870 informs network layer 420 that the NE is unreachable. The polling thread continues to poll the NE for some time. If the NE is reached again but the NE indicates that the NMS is not in the NE's list 350, the polling thread re-registers with the NE and obtains the cross connect information 440 and circuit information 480, as described above. If the NE is reached and indicates that the NMS is still registered with the NE, the NMS does not perform re-registration and does not obtain the cross connect and circuit information in some embodiments. This may happen, for example, if the NE was unreachable due to temporary disconnection of a link 130.

When the NMS sends a command 704 (see, for example, FIGS. 9 and 10) to create, delete, or modify a circuit or a cross connect, the NMS expects a TCP acknowledgment from the NE. If the TCP acknowledgment does not arrive, the corresponding polling thread 870 is informed. The polling thread polls the NE and performs the operations described above (informs the network layer, etc.).

If topology client 430 discovers a new link 130, network layer 420 displays the new link to the user.

Figure 11:
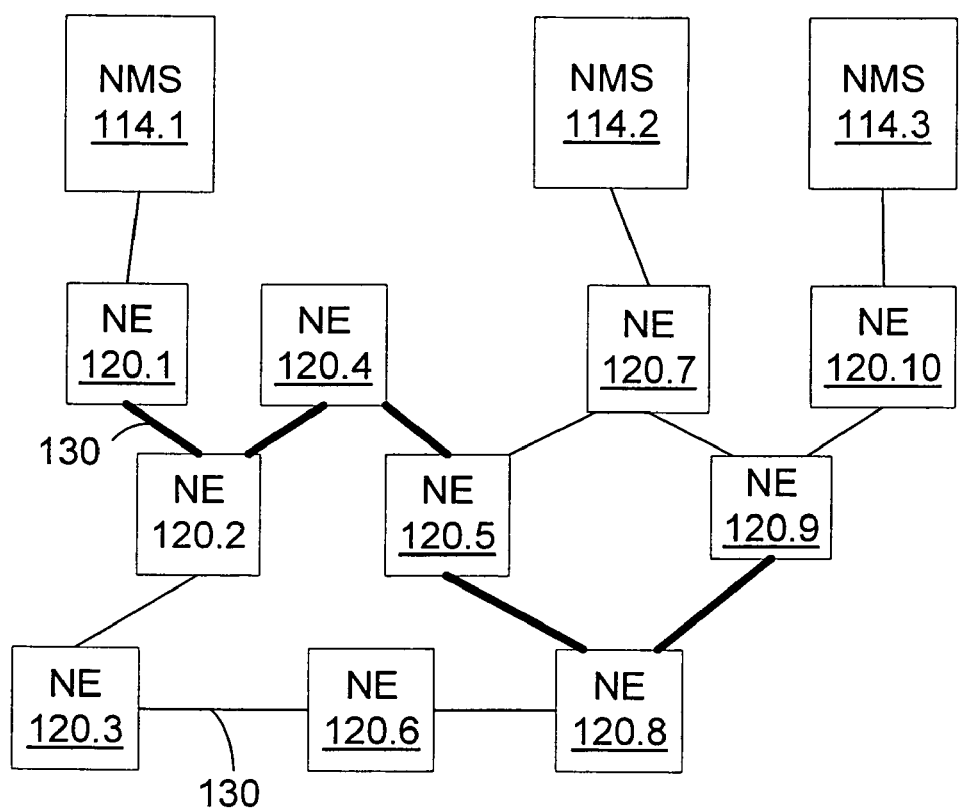
FIG. 11 is a block diagram of a network and network management systems according to embodiments of the present invention.

FIG. 11 illustrates an example in which three NMS systems 114.1, 114.2, 114.3 run simultaneously. NMS 114.1 receives a command to create a circuit whose source is NE 120.1 and whose destination is NE 120.9. The links 130 through which the circuit passes are shown in thick lines. The intermediate NEs 120.2, 120.4, 120.5, 120.8, and the intermediate circuit spans, can be specified by the user or can be picked by NMS 114.1 automatically. The intermediate NEs and circuit spans define the circuit path. NMS 114.1 provisions the circuit by sending appropriate commands to the intermediate NEs. Each NE creates an XC object 440, and the source NE 120.1 creates the circuit info object 480. The NEs set up the appropriate cross connects, and send notifications to the NMS systems 140.1, 140.2, 140.3. The NMS systems query the NEs (as shown in 630.1 in FIG. 9). The NMS systems update their structures 450, 470 in response to the queries, and re-splice the circuits, as shown in FIG. 9.

Because each NMS has an up-to-date cross connect and circuit information, elimination of incomplete (orphaned) circuits is facilitated. Such circuits could result from inconsistent network management or circuit failures. For example, if a user has commanded to delete a circuit, and an NE was down and could not execute the command, the NE's cross connects for the circuit will not be deleted when the NE returns on-line. In some embodiments, an NE can set up only a limited number of STS or VT cross connects due to hardware or software limitations. The "orphaned" cross connects (cross connects that should have been deleted) impair the NE's ability to set up new cross connects. When the NE returns on-line, the NMS will query the NE, discover the NE's cross connect objects 440 and, possibly, circuit info object 480, and will display the corresponding circuit information to the user. If the NMS cannot splice the entire circuit, the status of the circuit will be displayed as "incomplete". (The incomplete status could also result from delays in the NMS getting the circuit and XC information from some NEs even if the circuit is actually complete. When the NMS receives the complete information, the NMS changes the status to the "complete" on screen 370.)

The user will recognize incomplete circuits which should have been deleted. The user can then reissue a command to delete such circuits, freeing the NE's cross connect resources.

Some embodiments of the present invention include NEs of type ONG 15454 (Trademark) available from Cisco Systems, Inc. of San Jose, Calif. NMS 114 is a system of type CTS™ (Cisco Transport Controller) available from Cisco Systems, Inc. Each NE of type ONG 15454 includes a timing and control card (TCC) that performs the operations described above in connection with FIGS. 4–10.

The invention is not limited to any particular types of NEs or NMS systems. In some embodiments, a network may include different types of NEs and/or be managed with different types of NMS systems. Some of the NMS systems may be incapable of acquiring cross connect information according to this invention. Further, some NMS systems, such as systems of type TL1, may be unable to assign circuit IDs when creating a circuit or a cross connect. In some embodiments, an NE of the present invention will set the circuit ID in object 440 to zero or some other predefined value if the circuit ID is not provided by the NMS. When another NMS operating in the same network according to some embodiments of the present invention receives the information on cross connects with zero circuit IDs, the NMS will splice the circuit based on the cross connect information. In some embodiments, the NMS may offer the user an option to upgrade the circuit with a unique (non-zero) circuit ID.

The invention is applicable to SDH (Synchronous Digital Hierarchy) and other networks, known or to be invented. The invention is not limited to any particular timing. For example, in FIG. 6, circuit splicing 670 can start before the element layer receives the cross connect information 440 and the circuit information 480 from all of the NEs. Other embodiments and variations are within the scope of the invention, as defined by the appended claims.

What is claimed is:

1. A computer readable medium comprising one or more computer instructions to be executed by a network element (NE) operable to implement each of:
    storing, for at least one cross connect configured on the NE, a circuit ID of a circuit that uses the cross connect,
    indicating to a first network management system (NMS) when (i) a cross connect on the NE has been added, deleted, or modified, and (ii) a circuit passing through the NE has been added, deleted or modified, and
    indicating to the first NMS when a cross connect or a circuit on the NE has been added, deleted, or modified on the NE in response to a command issued by a second NMS.

2. The computer readable medium of claim 1 wherein the computer instructions are operable to indicate to multiple network management systems when a cross connect or a circuit has been added, deleted, or modified on the NE.

3. The NE of claim 2 wherein the computer instructions are executed by one or more computer processors.

4. A network system comprising:
    a first and a second network management system (NMS); and
    a network element (NE), coupled to the first NMS, comprising circuitry, wherein the circuitry is configured to:
        configure one or more circuits passing through the NE,
        configure one or more cross connects, each cross connect switching an input signal received from a network onto at least one output signal transmitted to the network,
        provide, to the first NMS, information regarding the one or more cross connects and one or more circuits passing through the NE,
        store, for at least one cross connect, a circuit ID of a circuit that uses the cross connect,
        indicate to the first NMS at least one of an addition, a deletion, and a modification of one of a cross connect and circuit on the NE, and
        indicate to the first NMS at least one of an addition, a deletion, and a modification of one of a cross connect and circuit on the NE in response to a command issued by the second NMS.

5. The network system of claim 4 wherein the NE circuitry is operable to inform multiple network management systems when a cross connect or a circuit has been added, deleted, or modified on the NE.

6. The network system of claim 5 wherein the NE circuitry comprises one or more computer processors and a computer readable medium comprising one or more computer instructions to be executed by the one or more computer processors.

7. A computer program product comprising:
    a first set of instructions, executable on a processor, for implementing a network layer; and
    a second set of instructions, executable on the processor, for implementing an element layer.

8. The computer program product of claim 7 wherein the element layer comprises:
    configuration information related to one or more network elements (NE), wherein the information relates to one or more of the following:
        topology,
        cross connects, and
        circuits.

9. The computer program product of claim 7, wherein the first set of instructions comprises:
    a third set of instructions, executable on the processor, for implementing an element models list; and
    a fourth set of instructions, executable on the processor, for implementing a link models list.

10. The computer program product of claim 7, wherein the first set of instructions comprises:
    a fifth set of instructions, executable on the processor, for implementing an active topology clients list.

11. The computer program product of claim 10, wherein the first set of instructions further comprises:
    a sixth set of instructions, executable on the processor, for implementing an element models list; and
    a seventh set of instructions, executable on the processor, for implementing a link models list.

12. The computer program product of claim 11, wherein the first set of instructions further comprises:
    an eighth set of instructions, executable on the processor, for implementing a circuit watchdog.

13. The computer program product of claim 7, wherein the second set of instructions comprises:
    a ninth set of instructions, executable on the processor, for implementing an element model corresponding to a network element.

14. The computer program product of claim 13, wherein the first set of instructions comprises:
    a tenth set of instructions, executable on the processor, for implementing a link models list; and
    an eleventh set of instructions, executable on the processor, for implementing an element models list, wherein the element models list comprises references to element models.

15. The computer program product of claim 13, wherein the first set of instructions comprises:
    a twelfth set of instructions, executable on the processor, for implementing an active topology clients list.

16. The computer program product of claim 15, wherein the first set of instructions network layer further comprises:
    a thirteenth set of instructions, executable on the processor, for implementing a link models list; and
    a fourteenth set of instructions, executable on the processor, for implementing an element models list, wherein the element models list comprises references to element models.

17. The computer program product of claim 13, wherein the ninth set of instructions comprises:
    a fifteenth set of instructions, executable on the processor, for implementing a circuit information object.

18. The computer program product of claim 17, wherein the circuit information object comprises:
    at least one of a source network element identifier and a destination element identifier.

19. The computer program product software architecture of claim 18, wherein the circuit information object further comprises:
    at least one of a circuit type and a circuit size.

20. The computer program product of claim 18, wherein the circuit information object is associated with a circuit and further comprises:

information indicating that the circuit is one of unidirectional and bi-directional.

21. The computer program product of claim 13, wherein the ninth set of instructions comprises:
a sixteenth set of instructions, executable on the processor, for implementing an XC object, wherein
the XC object comprises at least one of a circuit identifier, a source interface index and a destination interface index.

22. The computer program product of claim 21, wherein the XC object further comprises:
at least one of a source STS number, a destination STS number, a source VT number and a destination VT number.

23. The computer program product of claim 13, wherein the ninth set of instructions comprises:
a seventeenth set of instructions, executable on the processor, for implementing a topology client.

24. A method comprising:
configuring a network management system (NMS) to manage a plurality of network elements (NE), the configuring comprising:
requesting cross connect information and circuit information from the NEs, wherein
the cross connect information and circuit information comprises
information associated with a cross connect and circuit added, deleted or modified by the NMS, and
information associated with a cross connect and circuit added, deleted or modified by a second NMS,
storing cross connect information and circuit information in an element model corresponding to each NE, and
updating an element models list comprising references to each element model in response to information stored in an element model.

25. The method of claim 24 further comprising:
creating an element model for each NE known to the NMS; and
creating an element model list comprising references to each element model.

26. The method of claim 25 further comprising:
for each element model, registering to receive cross connect and circuit information updates from an NE corresponding to each element model.

27. The method of claim 25 further comprising:
registering the NMS with a cross connect list object corresponding to each element model.

28. The method of claim 25 further comprising:
creating an active topology list comprising references to each topology host NE known to the NMS; and
for each topology host NE in the active topology list,
registering the NMS with a topology client corresponding to that topology host NE's element model,
requesting a topology map from the topology host NE,
registering with the topology host NE for topology updates, and
receiving the topology map from the topology host NE; and
updating the active topology list in response to information stored in the element models.

29. The method of claim 28 further comprising:
creating an element model for each previously unknown NE identified in the topology map and updating element model list to refer to the additional element models.

30. The method of claim 28 wherein the topology host NE is designated by the NMS to provide network topology information.

31. The method of claim 30 wherein the topology information comprises the following for each circuit known to the topology host NE:
the circuit source NE's IP address;
the circuit source NE's interface index;
the circuit destination NE's IP address;
the circuit destination NE's interface index;
protection; and
cost associated with the circuit.

32. The method of claim 25 wherein an NE initially known to the NMS comprises the NE to which the NMS is directly connected.

33. The method of claim 25 wherein an NE initially known to the NMS comprises a NE different than the one to which the NMS is directly connected and which has been designated.

34. A method comprising:
managing a network comprising a plurality of network management systems (NMS) and a plurality of network elements (NE), the managing comprising:
processing configuration information received from a NE at a NMS; and
causing the NMS to store the information, wherein
the information is stored in an element model corresponding to the NE.

35. The method of claim 34 further comprising comparing the information received by an NMS with previously stored information and if the information was previously known to the NMS then performing no further operations on the received information.

36. The method of claim 34 further comprising storing the information in an object within the element model.

37. The method of claim 34 further comprising:
issuing a command from a NMS to a NE, wherein
the NE is commanded to effect one of the creation and modification of a circuit on the NE.

38. The method of claim 37 further comprising:
causing the NE to effect one of the creation or modification of the circuit;
storing information related to the circuit at the NE; and
sending information related to the circuit to one or more NMSs known to the NE.

39. The method of claim 38, wherein the sending information related to the circuit further comprises:
sending a notification that the circuit has been created or modified;
processing requests from the NMSs for configuration information about the circuit; and
sending the requested information to NMSs that have sent requests.

40. The method of claim 34 further comprising:
issuing a command from a NMS to a NE, wherein
the NE is commanded to effect one of the creation and modification of a cross connect on the NE.

41. The method of claim 40 further comprising:
causing the NE to effect one of the creation or modification of the cross connect by the NE;
storing information related to the cross connect at the NE; and sending information related to the cross connect to one or more NMSs known to the NE.

42. The method of claim 41, wherein the sending information related to the cross connect further comprises:
sending a notification that the cross connect has been created or modified;
processing requests from the NMSs for configuration information about the cross connect; and
sending the requested information to NMSs that have sent requests.

43. The method of claim 34 further comprising:
issuing a command from a NMS to a NE, wherein
the NE is commanded to effect the deletion of a circuit.

44. The method of claim 43 further comprising:
causing the NE to delete the circuit;
modifying information stored at the NE related to the circuit; and
sending information related to the circuit to one or more NMSs known to the NE.

45. The method of claim 43 further comprising:
modifying circuit information at each of the plurality of NMSs in response to the information received from the NE, wherein the modifying circuit information comprises:
modifying circuit information stored in an element model corresponding to the NE;
informing a network layer of the NMS of the modification in the circuit information in the element model; and
modifying corresponding circuit information maintained in the network layer.

46. The method of claim 34 further comprising:
issuing a command from a NMS to a NE, wherein
the NE is commanded to effect the delete of a cross connect.

47. The method of claim 46 further comprising:
causing the NE to delete the cross connect;
modifying information stored at the NE related to the cross connect; and
sending information related to the cross connect to one or more NMSs known to the NE.

48. The method of claim 47 further comprising:
modifying cross connect information at each of the plurality of
NMSs in response to the information received from the NE, wherein the modifying cross connect information comprises:
modifying cross connect information stored in an element model corresponding to the NE;
informing a network layer of the NMS of the modification in cross connect information in the element model; and
modifying corresponding cross connect information maintained in the network layer.

49. A network under management comprising:
a plurality of network elements (NEs), wherein
each NE is configured to provide one or more circuits,
each NE is configured to provide one or more cross connects, and
each NE is configured to send information regarding the circuits and cross connects to other NEs and one or more network management systems (NMS); and
a NMS configured to receive from the NEs the information regarding circuits and cross connects, wherein
the NMS is configured to use the information to manage the circuits and cross connects on the NEs, and
the information comprises information associated with a circuit and cross connect added, deleted or modified by the NMS and information associated with a circuit and cross connect added, deleted or modified by a second NMS.

50. The NMS of claim 49 wherein,
the NMS is configured to register with each of the NEs to receive updates regarding changes in cross connect and circuit information, and
the NMS is configured to designate a host NE from which the NMS will receive network topology information.

51. A network element of claim 49 which is further capable of storing in a software object information identifying each cross connect.

52. The software object information of claim 51 which comprises:
a circuit identifier;
a source interface index for the cross connect;
a destination interface index for the cross connect;
an STS number; and
a VT number if the cross connect is a VT cross connect.

53. A system comprising:
means, responsive to configure a network management system (NMS) to manage a plurality of network elements (NE), for:
requesting cross connect information and circuit information from the NEs, wherein
the cross connect information and circuit information comprises
information associated with a cross connect and circuit added, deleted or modified by the NMS, and
information associated with a cross connect and circuit added, deleted or modified by a second NMS,
storing cross connect information and circuit information in an element model corresponding to each NE, and
updating an element models list comprising references to each element model in response to information stored in an element model.

54. The system of claim 53 further comprising:
means for creating an element model for each NE known to the NMS; and
means for creating an element model list comprising references to each element model.

55. The system of claim 54 further comprising:
for each element model, means for registering to receive cross connect and circuit information updates from a NE corresponding to each element model.

56. The system of claim 54 further comprising:
means for registering the NMS with a cross connect list object corresponding to each element model.

57. The system of claim 54 further comprising:
means for creating an active topology list comprising references to each topology host NE known to the NMS; and
for each topology host NE in the active topology list, means for registering the NMS with a topology client corresponding to that topology host NE's element model,
requesting a topology map from the topology host NE,
registering with the topology host NE for topology updates, and
receiving the topology map from the topology host NE; and
means for updating the active topology list in response to information stored in the element models.

58. The system of claim 57 further comprising:
means for creating an element model for each previously unknown NE identified in the topology map and updating element model list to refer to the additional element models.

59. The system of claim 57 wherein the topology host NE is designated by the NMS to provide network topology information.

60. The system of claim 59 wherein the topology information comprises the following for each circuit known to the topology host NE:
the circuit source NE's IP address;
the circuit source NE's interface index;
the circuit destination NE's IP address;
the circuit destination NE's interface index;
protection; and
cost associated with the circuit.

61. The system of claim 54 wherein an NE initially known to the NMS comprises the NE to which the NMS is directly connected.

62. The system of claim 54 wherein an NE initially known to the NMS comprises a NE different than the one to which the NMS is directly connected and which has been designated.

63. A computer readable medium comprising one or more computer instructions executable to implement each of:
configuring a network management system (NMS) to manage a plurality of network elements (NE), the configuring comprising:
requesting cross connect information and circuit information from the NEs, wherein
the cross connect information and circuit information comprises
information associated with a cross connect and circuit added, deleted or modified by the NMS, and
information associated with a cross connect and circuit added, deleted or modified by a second NMS,
storing cross connect information and circuit information in an element model corresponding to each NE, and
updating an element models list comprising references to each element model in response to information stored in an element model.

64. The computer readable medium of claim 63, wherein the computer instructions are further executable to implement each of:
creating an element model for each NE known to the NMS; and
creating an element model list comprising references to each element model.

65. The computer readable medium of claim 64, wherein the computer instructions are further executable to implement, for each element model, registering to receive cross connect and circuit information updates from an NE corresponding to each element model.

66. The computer readable medium of claim 64, wherein the computer instructions are further executable to implement registering the NMS with a cross connect list object corresponding to each element model.

67. The computer readable medium of claim 64, wherein the computer instructions are further executable to implement each of:
creating an active topology list comprising references to each topology host NE known to the NMS;
for each topology host NE in the active topology list,
registering the NMS with a topology client corresponding to that topology host NE's element model,
requesting a topology map from the topology host NE,
registering with the topology host NE for topology updates, and
receiving the topology map from the topology host NE; and
updating the active topology list in response to information stored in the element models.

68. The computer readable medium of claim 67, wherein the computer instructions are further executable to implement each of:
creating an element model for each previously unknown NE identified in the topology map; and
updating the element model list to refer to the additional element models.

69. A computer readable medium comprising
one or more computer instructions executable to implement each of:
managing a network comprising a plurality of network management systems (NMS) and a plurality of network elements (NE), the managing comprising:
processing configuration information received from a NE at a NMS; and
causing the NMS to store the information, wherein
the information is stored in an element model corresponding to the NE.

70. The computer readable medium of claim 69, wherein the computer instructions are further executable to implement comparing the information received by an NMS with previously stored information and if the information was previously known to the NMS then performing no further operations on the received information.

71. The computer readable medium of claim 69, wherein the computer instructions are further executable to implement storing the information in an object within the element model.

72. The computer readable medium of claim 69, wherein the computer instructions are further executable to implement issuing a command from a NMS to a NE, wherein the NE is commanded to effect one of the creation and modification of a circuit on the NE.

73. The computer readable medium of claim 72 further comprising one or more computer instructions executable to implement each of:
causing the NE to effect one of the creation or modification of the circuit;
storing information related to the circuit at the NE; and
sending information related to the circuit to one or more NMSs known to the NE.

74. The computer readable medium of claim 69, wherein the computer instructions are further executable to implement issuing a command from a NMS to a NE, wherein the NE is commanded to effect one of the creation and modification of a cross connect on the NE.

75. The computer readable medium of claim 74 further comprising one ore more computer instructions executable to implement each of:
causing the NE to effect one of the creation or modification of the cross connect by the NE;
storing information related to the cross connect at the NE; and
sending information related to the cross connect to one or more NMSs known to the NE.

76. The computer readable medium of claim 69, wherein the computer instructions are further executable to implement each of:

issuing a command from a NMS to a NE, wherein the NE is commanded to effect the deletion of a circuit.

77. The computer readable medium of claim 76 further comprising one or more computer instructions executable to implement each of:
- causing the NE to delete the circuit;
- modifying information stored at the NE related to the circuit; and
- sending information related to the circuit to one or more NMSs known to the NE.

78. The computer readable medium of claim 69, wherein the computer instructions are further executable to implement each of:
- issuing a command from a NMS to a NE, wherein the NE is commanded to effect the delete of a cross connect.

79. The computer readable medium of claim 78 further comprising one or more computer instructions executable to implement each of:
- causing the NE to delete the cross connect;
- modifying information stored at the NE related to the cross connect; and
- sending information related to the cross connect to one or more NMSs known to the NE.

* * * * *